United States Patent [19]

Gordon

[11] 3,869,520

[45] Mar. 4, 1975

[54] PROCESS FOR DEHYDROHALOGENATION OF TRICHLOROETHANE TO VINYLIDENE CHLORIDE

[75] Inventor: Ronnie D. Gordon, Richardson, Tex.

[73] Assignee: Continental Oil Company, Ponca City, Okla.

[22] Filed: June 21, 1972

[21] Appl. No.: 265,074

[52] U.S. Cl. ............................................. 260/654 D
[51] Int. Cl. ............................................. C07c 21/08
[58] Field of Search ............ 260/654 D, 656 R, 655, 260/677 XA

[56] References Cited
UNITED STATES PATENTS

| | | |
|---|---|---|
| 1,965,369 | 7/1934 | Carothers et al. ................. 260/655 |
| 2,404,927 | 7/1946 | Schmerling et al. ......... 260/677 XA |
| 2,561,516 | 7/1951 | Ladd et al. ..................... 260/654 D |
| 2,666,771 | 1/1954 | Zettlemoyer et al. .......... 260/654 D |
| 3,065,280 | 11/1962 | Vogt .............................. 260/654 D |
| 3,240,834 | 3/1966 | Kruse et al. ..................... 260/654 D |
| 3,290,398 | 12/1966 | Richtzenhain et al. ......... 260/654 D |

*Primary Examiner*—Delbert E. Gantz
*Assistant Examiner*—Joseph A. Boska
*Attorney, Agent, or Firm*—Ronald J. Carlson

[57] ABSTRACT

Vinylidene chloride may be produced by reacting trichloroethane with an alkali metal or alkaline earth metal hydroxides or carbonates in an aqueous medium at low temperatures in the presence of a reaction aid.

8 Claims, No Drawings

PROCESS FOR DEHYDROHALOGENATION OF TRICHLOROETHANE TO VINYLIDENE CHLORIDE

This invention relates to a process for dehydrohalogenation of trichloroethane to vinylidene chloride and, more particularly, to such dehydrohalogenation processes which may be operated at relatively low temperatures.

Various high temperature catalytic dehydrohalogenation processes are known in the art as generally exemplified by U.S. Pat. No. 2,843,638; U.S. Pat. No. 2,898,383; U.S. Pat. No. 2,912,470; and U.S. Pat. No. 3,352,935. In particular, the catalytic dehydrohalogenation of 1,1,2-trichloropropane to 1,1-dichloropropene-1 at temperatures in excess of 250°C is described in U.S. Pat. No. 2,134,102. This patent also describes non-catalytic dehydrohalogenation of the same materials using either an aqueous basic material such as sodium hydroxide at temperatures as low as 75°C or an alcoholic solution of basic material at room temperature. Insofar as producing vinylidene chloride from trichloroethane is specifically concerned, it is suggested in U.S. Pat. No. 2,803,.679 to contact 1,1,1-trichloroethane at a temperature of at least 150°C with a dehydrochlorination catalyst selected from the group consisting of metal salts and metal oxides of a metal in Group II of the Periodic Table. It is indicated in the patent that this catalytic dehydrochlorination process tends to give low conversion when temperatures below 150°C are employed. A noncatalytic dehydrochlorination of 1,1,2-trichloroethane to produce vinylidene chloride is described in U.S. Pat. No. 3,290,398 wherein the trichloroethane is reacted with an aqueous solution or suspension of an alkali metal hydroxide or an alkaline earth metal hydroxide at head temperatures of at least 68°C. It is further indicated that the reaction does not proceed at head temperatures of about 60°C. Thus, it is apparent from the above-described prior art that the dehydrochlorination of trichloroethane to vinylidene chloride by reaction with a basic material in an aqueous medium necessitated the use of relatively high temperatures.

In accordance with this invention, there is provided a process for reacting trichloroethane with a basic material in an aqueous medium to produce vinylidene chloride wherein the reaction may be carried out at far lower temperatures than heretofore known with reactions of this type and still obtain good conversion of the trichloroethane to vinylidene chloride. Briefly described, the process of this invention involves reacting trichloroethane with a basic material in an aqueous medium in the presence of a reaction aid.

The trichloroethane which may be dehydrochlorinated in accordance with the process of this invention may comprise any of the isomeric forms or mixtures thereof. For example, 1,1,1-trichloroethane; 1,1,2-trichloroethane; etc; may be employed. However, the 1,1,2-isomer is preferred.

The basic materials which may be employed include the alkali metal hydroxides or alkaline earth metal hydroxides or carbonates. Illustrative of the carbonates are calcium carbonate, sodium carbonate, potassium carbonate and the like. In the reaction mixture, these materials will be in an aqueous medium either in solution or suspension and, thus, any alkali metal compound or alkaline earth metal compound which forms a hydroxide on contact with water is suitable for use in the invention. Illustrative of the hydroxides which may be employed include lithium hydroxide, sodium hydroxide, potassium hydroxide, calcium hydroxide, barium hydroxide and the like. Alkali metal hydroxides are preferred. The amount of basic material employed in the process is not an essential feature of the invention as any amount may be employed and some trichloroethane will be converted to vinylidene chloride. However, it will be understood by those skilled in the art, when employing less than a 1 to 1 molar ratio of basic material to trichloroethane the amount of trichloroethane converted to vinylidene chloride will be similarly reduced. on the other hand, employing amounts of basic material much in excess of a 1 to 1 molar ratio will not achieve any further benefit.

The amount of water employed may vary considerably as is known in the art and does not constitute an essential feature of the invention. For practical reasons it is obviously desirable that the aqueous medium be saturated or nearly saturated with basic material. In general, water may be present in an amount of about 1 weight percent to about 500 weight percent based on the basic material. Preferably, to obtain substantially complete conversion of the trichloroethane to vinylidene chloride, it is desirable to employ one mol of basic material per mol of trichloroethane or a slight excess thereof. This can be easily determined by one skilled in the art without undue experimentation. Normally, the mol ratio of basic material to trichloroethane will be in the range of about ten to one to about one to ten.

The reaction aid may be activated carbon, activated charcoal, activated alumina, or activated (porous) silica, all of which are commercially available. The amount of reaction aid employed should be at least about 0.1 weight percent based on the trichloroethane. Any amount above this may be employed with the only limitation being one of practical consideration. Thus, amounts as high as 90 weight percent based on the trichloroethane may be used. Generally, an increased reaction rate will be obtained with increased amounts of reaction aid.

The reaction may be carried out by charging the trichloroethane, reaction aid and the aqueous solution or suspension of the alkali metal or alkaline earth metal hydroxide or carbonate to a reaction vessel. The vessel should be equipped with some means for stirring to insure that the reaction mixture is mixed to some extent. The reaction will proceed spontaneously at temperatures as low as about 0°C at reasonable rates with good yields.

It should be understood that the reaction may be conducted in a total liquid phase, that is, at temperatures wherein the reactants are in a liquid phase. Moreover, the reaction may be conducted at temperatures below the boiling point of vinylidene chloride, e.g., 37°C, whereby the product is also in a liquid phase. On the other hand, the reaction may be conducted at or slightly above 37°C wherein the vinylidene chloride product distills from the reaction mixture as it is formed. This obviously offers advantages in terms of less time for product recovery.

While the reaction carried out in accordance with this invention may be conducted at temperatures far lower than heretofore known for this type of reaction, it is also pointed out that the reaction will take place with equal ease at elevated temperatures such as those disclosed in the prior art.

The following examples will serve to further illustrate the above-described invention.

EXAMPLE 1

In order to demonstrate the effectiveness of the invention, a first experiment was conducted wherein a 250 ml flask was charged with 13.4 g (0.1 mol) 1,1,2-trichloroethane and 8.0 g (0.2 mol) of NaOH dissolved in 40 ml water and stirred at 25°C for 48 hours. No detectable reaction occurred during this time as indicated by GLC.

By comparison, the same experiment was repeated except 0.1 g of activated charcoal was included in the reaction mixture. The reaction progress was monitored by periodically sampling the reaction mixture at various time intervals and analyzing by GLC to determine percent conversion of the trichloroethane to vinylidene chloride. The results are indicated in the following table.

TABLE

| Time of Sample (hr)[1] | Percent Conversion |
|---|---|
| 0 | 0 |
| 0.5 | 23.3 |
| 1.0 | 35.2 |
| 2.0 | 46.1 |
| 20.0 | 87.0 |

[1] Measured from time reactants and reaction aid were charged to flask.

EXAMPLE 2

The procedure according to the second experiment of Example 1 was followed except that the flask was fitted with a distillation head and the reaction was carried out at 37°C. The reaction progressed and the vinylidene chloride product distilled from the reaction mixture as it was formed. At the end of about 3 hours it was determined that about 80 percent of the trichloroethane had been converted.

EXAMPLE 3

Following the procedure according to the second experiment of Example 1, similar results may be obtained by substituting 1,1,1-trichloroethane and potassium hydroxide for the reactants.

EXAMPLE 4

Similar results may be obtained by following the procedure set forth in Example 2 but substituting activated alumina, activated carbon, or porous silica for the activated charcoal.

EXAMPLE 5

Following the procedure of Example 2 similar results may be obtained by substituting calcium hydroxide, barium hydroxide, calcium carbonate, potassium carbonate, sodium carbonate or lithium hydroxide for the sodium hydroxide.

Thus, having described the invention in detail, it will be understood by those skilled in the art that certain variations and modifications may be made without departing from the spirit and scope of the invention as described herein and in the appended claims.

I claim:

1. A process for producing vinylidene chloride which comprises reacting trichloroethane with an alkali metal or alkaline earth metal hydroxide or carbonate in an aqueous medium at temperature as low as 0°C in the presence of a reaction aid, said reaction aid being activated carbon, activated charcoal, activated alumina, or porous silica.

2. A process according to claim 1 wherein the reaction aid is employed in an amount of at least 0.1 weight percent based on the trichloroethane.

3. A process according to claim 1 wherein the trichloroethane is 1,1,2-trichloroethane.

4. A process according to claim 1 wherein the mol ratio of alkali metal or alkaline earth metal hydroxide or carbonate to trichloroethane is in the range of about ten to one to about one to ten.

5. A process according to claim 1 wherein an alkali metal hydroxide is employed.

6. A process acording to claim 5 wherein the alkali metal hydroxide is sodium hydroxide.

7. A process according to claim 1 wherein the reaction aid is activated carbon or activated charcoal.

8. A process according to claim 1 wherein the reaction aid is activated alumina.

* * * * *